Jan. 18, 1955       N. RAKOS       2,699,850
CLUTCH AND BRAKE CONTROL FOR REVERSE GEAR MECHANISM
Filed Sept. 19, 1950                   4 Sheets-Sheet 1

Nicholas Rakos
INVENTOR.

BY
Attorneys

Nicholas Rakos
INVENTOR.

Jan. 18, 1955   N. RAKOS   2,699,850
CLUTCH AND BRAKE CONTROL FOR REVERSE GEAR MECHANISM
Filed Sept. 19, 1950   4 Sheets-Sheet 3
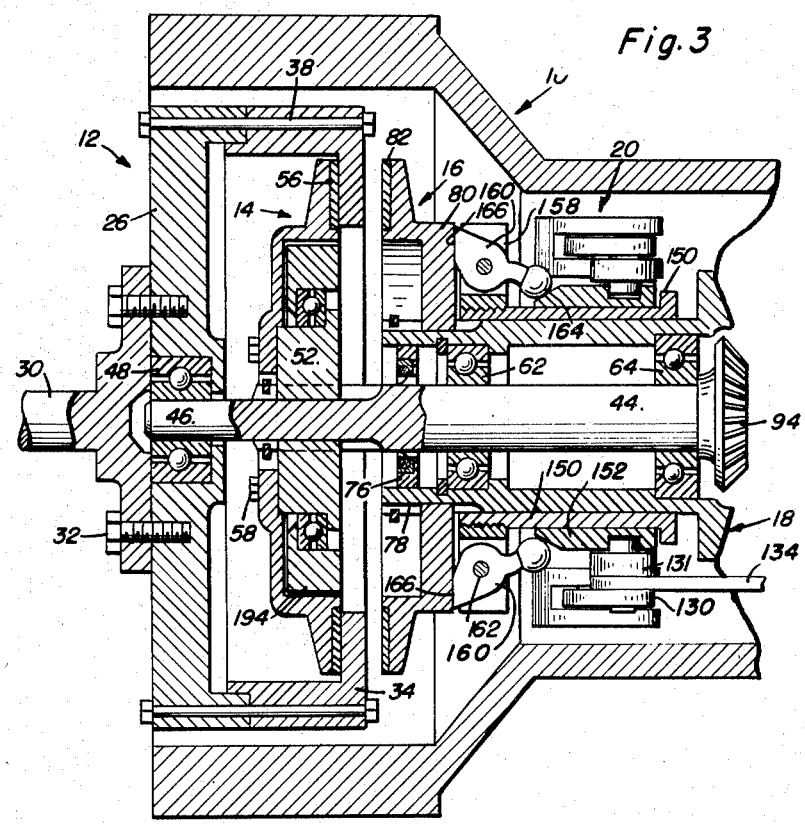
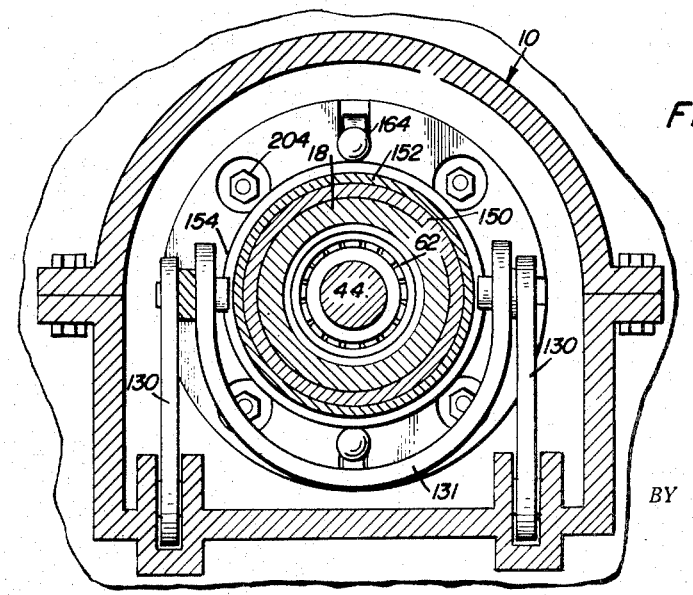
Nicholas Rakos
INVENTOR.

Jan. 18, 1955              N. RAKOS              2,699,850
CLUTCH AND BRAKE CONTROL FOR REVERSE GEAR MECHANISM
Filed Sept. 19, 1950              4 Sheets-Sheet 4
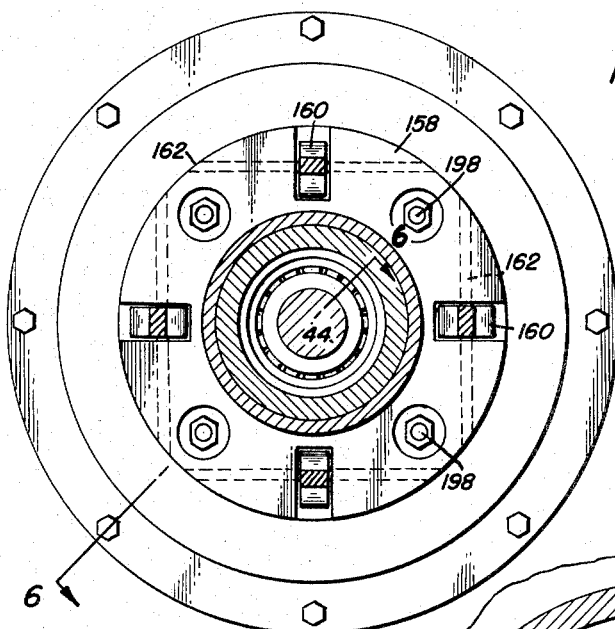
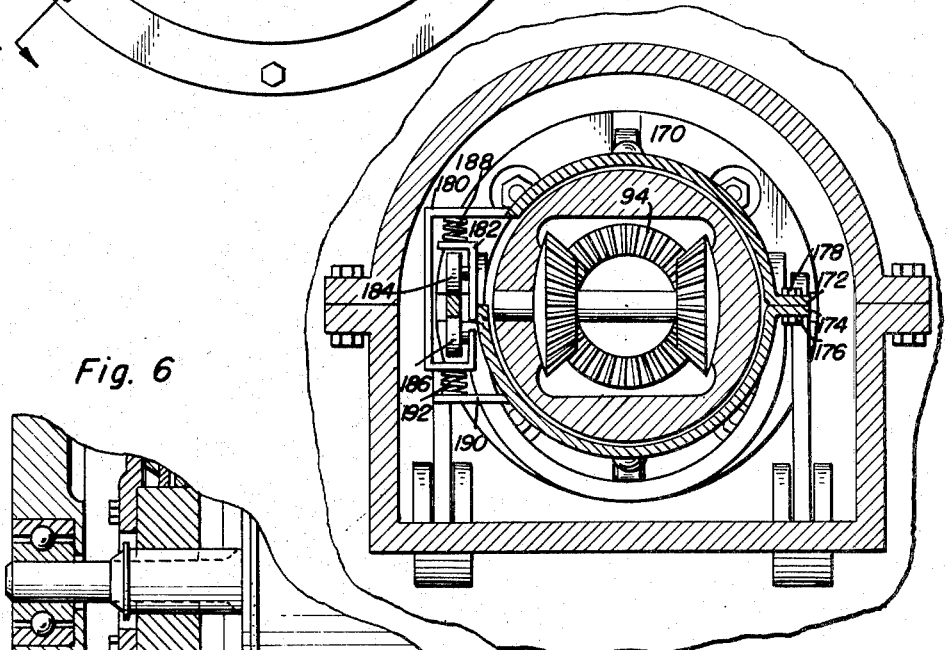
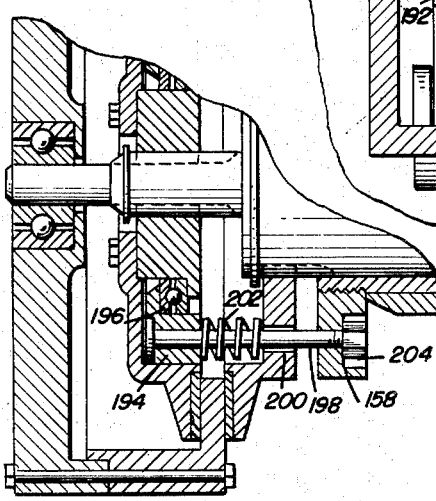
Nicholas Rakos
INVENTOR.

United States Patent Office 2,699,850
Patented Jan. 18, 1955

2,699,850
CLUTCH AND BRAKE CONTROL FOR REVERSE GEAR MECHANISM

Nicholas Rakos, Cleveland, Ohio

Application September 19, 1950, Serial No. 185,595

1 Claim. (Cl. 192—17)

The present invention relates to improvements in transmission mechanisms for marine engines, and the like, and more particularly to a mechanism wherein positioning of a bellcrank in a first position provides a direct drive between the flywheel, a first shaft, and a second driven shaft, and positioning of the bellcrank in a second position effects a reversing drive between the flywheel means and first shaft and the second driven shaft.

An object of the present invention is to provide a novel transmission mechanism for marine engines, or the like, wherein a novel means is employed for simply effecting a reverse drive from the flywheel means which continuously rotates in a single direction.

Another object of the present invention is to provide an improved mechanism wherein a first clutch disk continuously frictionally engages the flywheel means for continuously effecting rotation of a first shaft, a reversing gear train being connected to the first shaft and effecting a reverse drive of the driven shaft, frictional engagement of a second clutch disk being accompanied by free rotation of the reversing gear housing, whereby both clutch disks, the first shaft, the second driven shaft, the reverse gear means, and the reverse gear housing will simultaneously rotate to provide a direct drive.

Still another novel feature of the present invention resides in the novel arrangement whereby the reversing gear housing is selectively rotatably or non-rotatably supported.

Another object of the present invention is to provide a means whereby the wear in the clutch disk may be resiliently taken up.

Various other objects and advantages will become apparent from the detailed description to follow. The means by which the objects of the present invention are accomplished include the provision of the flywheel means rotatably disposed within the transmission mechanism housing, a power take-off means including a first clutch disk being keyed to a first shaft which is rotatably disposed within the housing and wherein the first disk is constantly frictionally engaged for rotation with the flywheel means, a reversing gear housing disposed within the transmission housing and a reverse gear means disposed within the reversing gear housing, the first shaft being connected to a drive gear of the reverse gear means for driving a driven gear in a reverse direction, and a second shaft connected for rotation with the driven gear and extending from the transmission housing. The power take-off means also includes a second clutch disk which is selectively frictionally engageable with the flywheel means, and an actuating means is provided for selectively moving the second clutch disk into and out of engagement with the flywheel means. The second clutch disk is keyed to the reversing gear housing for rotation therewith, and means are provided for selectively maintaining the reversing gear housing rotatably supported and fixedly supported when said second clutch disk is in and out of engagement with the flywheel means, respectively, whereby, when the first and second disks are in engagement with the flywheel means, the reversing gear housing is rotatably supported and the first shaft, second shaft, reverse gear means, and reversing gear housing will rotate as a unit to give direct drive.

The means of my invention are clearly illustrated in the accompanying drawings, wherein:

Figure 3 is a detail sectional view showing a portion of the mechanism when in the position for reverse drive;

Figure 4 is a vertical transverse sectional view taken substantially along the plane of line 4—4 of Figure 1;

Figure 5 is a vertical transverse sectional view taken substantially along the plane of line 5—5 of Figure 1;

Figure 6 is a detail sectional view taken substantially along the plane of line 6—6 of Figure 4 and showing the details of the disk wear take-up means; and Figure 7 is a vertical transverse sectional view taken substantially along the plane of line 7—7 of Figure 1.

Figure 1:
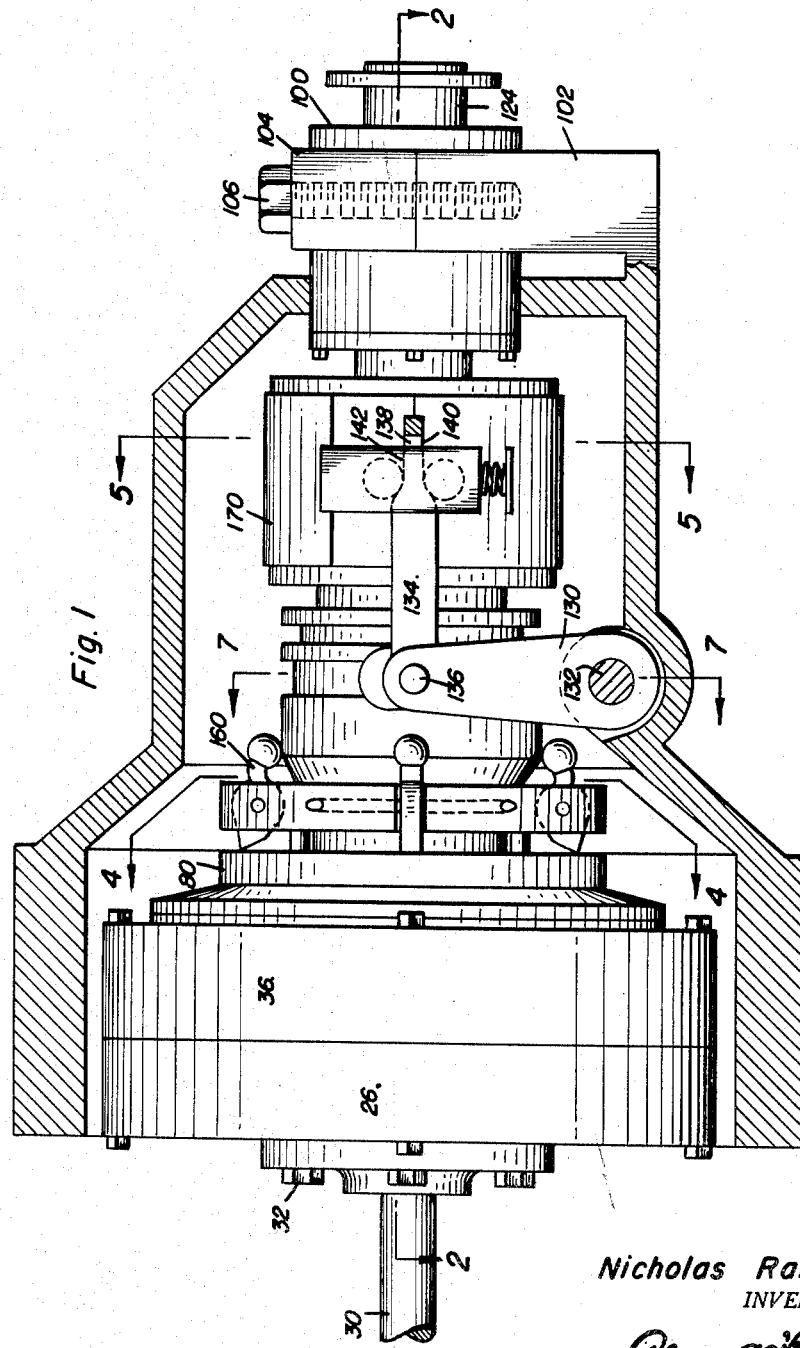
Figure 1 is a side elevational view with the transmission housing in section and with the bellcrank in its direct drive position.

Referring more particularly to the drawings, wherein like numerals designate like parts throughout, the numeral 10 designates generally the transmission housing in which the structure of the present invention is mounted, the numeral 12 designates generally the flywheel means, the numeral 14 refers to the first clutch disk means, the numeral 16 designates the second clutch disk means, the numeral 18 designates generally the reversing gear housing, the numeral 20 designates generally the operating means for effecting longitudinal movement of the second clutch disk means 16 and for operating the means 22 for selectively, rotatably and fixedly supporting the reversing gear housing 18. The numeral 24 designates generally the reverse gear means and first and second shafts.

Figure 2:
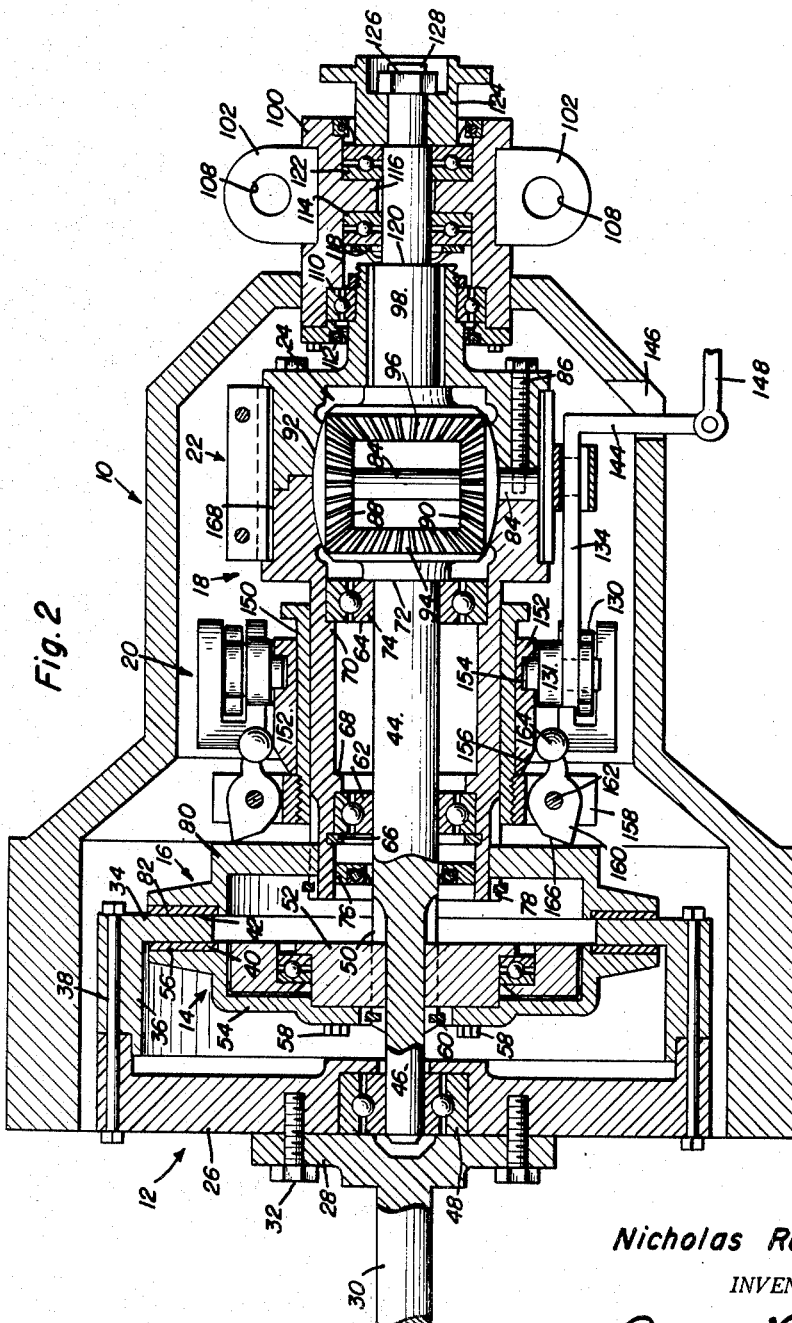
Figure 2 is a horizontal longitudinal sectional view taken substantially along the plane of line 2—2 of Figure 1 and showing the arrangement providing a direct drive.

Looking now at Figures 1 and 2, it will be seen that the flywheel means 12 consists of a conventional flywheel 26 which is attached, by means of a plurality of bolts 32, to the disk 28 integrally formed on the end of the drive shaft 30 rotated by the prime mover (not shown). A means is provided for taking the power from the flywheel 26 and is comprised of the disk 34 which has an annular ring portion 36 which is adapted to be connected to the flywheel 26 by means of the elongated bolt 38. The disk 34 provides a pair of surfaces 40 and 42 which are adapted to be engaged by the clutch disks to be hereinafter described.

A first shaft 44 is rotatably disposed within the transmission housing 10 and has a reduced end 46 thereof supported by the ball bearing unit 48 in the flywheel 26. The first shaft 44 is provided with a plurality of longitudinally extending slots 50 to which the ring 52 is keyed. The first clutch disk means 14 includes the plate 54 having a clutch facing 56 secured thereto and for engagement with the surface 40 of the ring 34 connected to the flywheel 26. The plate 54 is securely attached to the ring 52 for rotation therewith by means of the bolts 58. A retaining ring 60 is provided for preventing displacement of the ring 52 beyond a predetermined point.

The reversing gear housing 18 is rotatably supported on the first shaft 44 by means of the bearing units 62 and 64. A locking ring 66 maintains the bearing unit 62 in fixed position within the housing 18 and against the shoulder 68, while the bearing unit 64 is maintained against the shoulder 70 by means of the shoulder 72 on the first shaft 44 which is engaged with the inner ring 74 of the bearing unit 64. The housing 18 is also provided with a sealing ball bearing unit 76 which closes off the end of the housing 18.

The reversing gear housing 18 is provided with a plurality of longitudinally extending grooves 78 and a second clutch disk means 16 comprised of a plate 80 is mounted on the end portion of the housing 18 and keyed in the slot 78. The clutch plate 80 of the second clutch disk means 16 is provided with a clutch facing 82 which is adapted to engage the face 42 of the ring 34 connected for rotation with the flywheel 26.

The reversing gear housing 18 has securely mounted therein a bearing shaft 84 which is held from rotation by means of the set screw 86. A pair of bevel gears 88 and 90 are mounted for free rotation on the shaft 84. Each of the bevel gears 88 and 90 is provided with a surface having a substantially constant radius of curvature which is in free slidable contact with a similar surface formed within the housing 18 and designated by the numeral 92. A second pair of bevel gears 94 and 96 are positioned within the housing 18 and are interconnected by the bevel gears 88 and 90. The bevel gear 94 is integrally formed with the first shaft 44, while the driven bevel gear 96 is integrally formed with the second and driven shaft 98 which is rotatably disposed within the outer end of the reversing gear housing 18 and extends from the transmission housing 10.

The outer end of the transmission housing 10 is formed with a sleeve 100 extending axially therefrom and provided with a supporting means 102 to which is clamped a C-shaped element 104 by means of a pair of bolts 106 engageable in the threaded bores 108. Thus, the sleeve 100 will be held from rotation with respect to the transmission housing 10. The sleeve 100 is provided with a first bearing unit 110 which rotatably supports the outer end of the reversing gear housing 18. A sealing bearing 112 is secured to the inner end of the sleeve 100 and bears against the outer periphery of the outer portion of the housing 18. A second bearing unit 114 is engaged against the shoulder 116 of the sleeve 100 and a spring 118 extends from the shoulder 120 on the second shaft 98 and bears against the thrust bearing 114 to maintain the second shaft 98 from outward movement. A third bearing unit 122 is disposed on the opposite side of the shoulder 116 and provides a thrust bearing for the member 124 which is secured on the outer end of the second shaft 98 by means of the nut 126 threadably engaged on the outer threaded end 128. The means to be driven may be secured to the member 124 for rotation therewith.

The bellcrank means 20 for effecting longitudinal movement of the second clutch disk means 16 is composed of a pair of bellcrank members 130 which are pivotally supported on a pair of stub shafts 132, the bellcranks 130 being disposed on opposite sides of the reversing gear housing 118. The upper end of one of the bellcranks 130 has connected thereto a cam surface bar 134 by means of the pin 136. The bar 134 is provided with a reduced portion 138 and has a pair of cam surfaces 140 and 142. The bar 134 terminates in an angulated portion 144 which extends outwardly through an opening 146 in the transmission housing 10 and is connected to a linkage 148 which may be reciprocated by any desired means.

The bellcranks 130 may be pivoted by the linkage means 148 and the pins 136 will be moved therewith. The housing 18 is provided with a sleeve 150 which is press-fitted into position and slidably receives the sleeve 152 for limited longitudinal movement. The sleeve 152 is provided with a plurality of recesses 154 which are adapted to receive end portions of the stub shafts 132. The sleeve 152 is also provided with a beveled cam surface 156. A ring 158 is threaded on the sleeve 150 and limits the movement of the sleeve 152 in one direction. The ring 158 is provided with a plurality of longitudinally extending slots in which a plurality of dogs 160 are rotatably disposed on pins 162. The dogs 160 each has one end thereof formed with a cam surface engaging ball 164 and has the other end formed with a clutch plate engaging portion 166. It will now be readily seen that when the bellcranks are pivoted upon movement of the linkage 148, the sleeve 152 will be longitudinally moved engaging the ball end 164 of the dog 160, thereby effecting pivoting of the dogs and engagement between the surface 166 and the clutch plate 80. The clutch plate 80 will be longitudinally displaced thereby and will engage the surface 42 of the ring 34 for rotation with the flywheel 26.

The reversing gear housing 18 is provided with a peripheral groove 168 about which the means 22 is disposed. The means 22 is composed of a cylindrical split sleeve 170, as best shown in Figure 5. A pair of end portions 172 and 174 of the ring 170 are joined by the bolt 176 and nut 178. The free ends of the sleeve 170 are formed with angulated straps 180 and 182. A pair of rollers 184 and 186 are rotatably disposed on the angulated ends 180 and 182 and are in spaced parallel relation to each other. A spring 188 is disposed between the angulated end portions 180 and 182 to resiliently urge the rollers 184 and 186 together. An outwardly extending bar 190 is disposed below the angulated end portion 180 and a spring 192 is disposed for normally urging the roller 186 upwardly toward the roller 184.

Looking once again at Figure 1, it will be seen that the cam surfaced bar 134 is disposed between the rollers 184 and 186. As the bar 134 is longitudinally moved in response to movement of the linkage 148, it will readily be seen that when the second clutch disk 16 is engaged for rotation with the flywheel 26, the bar 134 will have moved to the left and the rollers 184 and 186 will be engaged with the reduced portion 138, and the sleeve 170 will be loosely received on the housing 18, permitting relative rotation therebetween. Thus, both clutch disks 14 and 16 will be rotating with the flywheel 26 and the reversing gear housing 18, first shaft 44, reverse gears 24 and driven shaft 98 will all be rotating together to provide a direct drive as shown in Figure 2.

When it is desired to reverse the direction of rotation of the driven shaft 98, the linkage 148 is moved to the right, thereby pivoting the bellcrank arms 130 to the right. The sleeve 152 will move to the right with the bellcranks 130 and the dogs 160 will be removed from engagement with the second clutch disk means 16, thereby breaking the frictional contact between the second clutch and the ring 34. At the same time, the bar 134 will move to the right and the enlarged portion will be engaged between the rollers 184 and 186, urging them apart against the resiliency of the springs 188 and 192. This will effect clamping of the sleeve 170 on the housing 18 and will prevent relative rotation therebetween. Thus, the first clutch disk 14 which is constantly in engagement with the ring 34 will be rotated with the flywheel 26 and the first shaft 44 will reversely drive the second shaft 98 through the reversing gear means 24.

The means for taking up the clutch disk wear is shown best in Figure 6. A ring 194 is rotatably disposed with respect to the first clutch disk means 14 by means of the bearing unit 196. A plurality of lugs 198 extend through the ring 194 and through apertures 200 in the second clutch disk means 16 and have their ends secured to the ring 158 at intervals spaced from the dogs 160. A resilient coil spring 202 is disposed between the ring 194 and the second clutch disk means 16 to resiliently maintain them in spaced relation. The nuts 204 disposed on the ends of each of the lugs 198 may be adjusted to vary the distance between the ring 158 and the first clutch disk means 14 and to resiliently maintain in adjusted relation the first and second clutch disk means 14 and 16.

From the foregoing description, taken in conjunction with the drawings, it is believed that a device has been provided which will accomplish all of the objects hereinabove set forth.

Having described the invention, what is claimed as new is:

In a transmission mechanism having a transmission housing and an input member, a transmission member, a clutch plate selectively frictionally engaging the transmission member with the input member and a brake selectively locking the transmission member with respect to the transmission housing; an actuating mechanism for selectively alternately moving the clutch plate and the brake to operating position comprising a bellcrank mounted in the transmission housing, a link, a pivot connection between said link and said bellcrank, said link mounted in and extending outwardly of the transmission housing, a sleeve slidably disposed on the transmission member, said bellcrank being operatively connected to said sleeve at the point of said pivot connection between said bellcrank and said link, a cam surface on said sleeve, the clutch plate being slidable on the transmission member, a plurality of dogs pivotally mounted on the transmission member between said sleeve and the clutch plate, said dogs including cam ends engageable with said cam surface, the opposite ends of said dogs being engageable with the clutch plate, a cam on said link, said cam being movable into operative engagement with said brake, movement of said link in one direction causing engagement of the clutch plate and release of the brake, and movement of said link in the opposite direction causing disengagement of the clutch plate and application of the brake.

References Cited in the file of this patent

UNITED STATES PATENTS

| | | |
|---|---|---|
| 955,717 | Struck | Apr. 19, 1910 |
| 1,099,509 | Nelson | June 9, 1914 |
| 1,230,573 | Froelich | June 19, 1917 |
| 1,235,151 | Nelson | July 31, 1917 |
| 1,906,790 | Greve | May 2, 1933 |
| 2,077,663 | Batter | Apr. 20, 1937 |
| 2,189,109 | Hacker | Feb. 6, 1940 |
| 2,280,355 | Spase et al. | Apr. 21, 1941 |
| 2,472,750 | Lavash | June 7, 1949 |
| 2,587,015 | Walter | Feb. 26, 1952 |

FOREIGN PATENTS

| | | |
|---|---|---|
| 6,827 | France | Mar. 20, 1907 |
| | (Addition to No. 361,260) | |
| 139,482 | Germany | Mar. 17, 1903 |